United States Patent [19]

Leffel et al.

[11] Patent Number: 5,489,073
[45] Date of Patent: Feb. 6, 1996

[54] SIDE FLEX LEADING EDGE ICE PROTECTOR

[75] Inventors: Kevin L. Leffel, Akron; Richard L. Rauckhorst, III, North Canton, both of Ohio

[73] Assignee: The B. F. Goodrich Company, Akron, Ohio

[21] Appl. No.: 149,873

[22] Filed: Nov. 10, 1993

[51] Int. Cl.⁶ .................................................... B64D 15/00
[52] U.S. Cl. ...................................................... 244/134 R
[58] Field of Search ................................................ 244/134

[56] References Cited

U.S. PATENT DOCUMENTS

| | | |
|---|---|---|
| 4,678,144 | 7/1987 | Goehner et al. . |
| 5,098,037 | 3/1992 | Leffel et al. ............... 244/134 A |
| 5,129,598 | 7/1992 | Adams et al. ............. 244/134 A |
| 5,314,145 | 5/1994 | Rockhorst ................. 244/134 A |

OTHER PUBLICATIONS

AIAA 89-0758 "Electromagnetic Emissions From A Modular Low Voltage EIDI System" P. Zieve, B. Huffer and J. Ng, Electroimpact Inc., Seattle, WA 27th Aerospace Science Meeting Jan. 9–12, 1989/Reno, Nevada.

*Primary Examiner*—Galen L. Barefoot
*Attorney, Agent, or Firm*—Richard A. Romanchik

[57] ABSTRACT

An airfoil deicing system includes an airfoil substructure having an apex corresponding to the portion of the airfoil where the radius of curvature of the airfoil is smallest, the airfoil and the apex being bisected by a centerline, a deflectable shell disposed over the airfoil substructure for meeting and breaking an impinging airstream, a deflection means disposed between the airfoil substructure and the deflectable shell at the apex for deflecting the deflectable shell in the area of the apex away from the airfoil substructure and, at least one compressible zones provided beneath the deflectable shell adjacent the apex on either side of the centerline, the compressible zones facilitating deflection of the deflectable shell overlying the compressible zones toward the airfoil substructure when the deflection means deflects the deflectable shell.

42 Claims, 5 Drawing Sheets

SIDE FLEX LEADING EDGE ICE PROTECTOR

FIELD OF THE INVENTION

This invention relates to de-icing apparatus, and more particularly, a leading edge deicer having an active apex element and side flexing outer shell.

BACKGROUND OF THE INVENTION

From the beginning of powered aviation, aircraft have been under certain flying conditions troubled by accumulations of ice on component surfaces of aircraft such as wings and struts. If unchecked, such accumulations can eventually so laden the aircraft with additional weight and so alter the airfoil configuration of the wings and control surfaces of that aircraft so as to precipitate an unflyable condition. Efforts to prevent and/or remove such accumulations of ice under flying conditions has resulted in three generally universal approaches to removal of accumulated ice, a process known generally as de-icing.

In one form of de-icing, known as thermal de-icing, leading edges are heated to loosen adhesive forces between accumulating ice and the aircraft component. "Leading edges" as used herein means those edges of an aircraft component on which ice accretes and are impinged upon by air flowing over the aircraft and having a point or line at which this airflow stagnates. Once loosened, this ice is generally blown from the aircraft component by the airstream passing over the aircraft. There are two popular methods of heating leading edges. In one approach known as electrothermal deicing, an electrical heating element is placed in the leading edge zone of the aircraft component, either by inclusion in a elastomeric boot applied over the leading edge, or by incorporation into the skin structure of the aircraft component. This heating element is typically powered by electrical energy derived from a generating source driven by one or more of the aircraft engines and is switched on and off to provide heat sufficient to loosen accumulating ice. In small aircraft, a sufficient quantity of electrical power may be unavailable for use of electrothermal de-icing.

In the other heating approach, gases at elevated temperature from one or more compression stages of a turbine engine are circulated through the leading edges of components such as wings and struts in order to affect a de-icing or anti-icing effect. This approach is employed typically only in aircraft powered by turbine engines by draining off compressed air having an elevated temperature from one or more compressor stations of a turbine engine. This approach can result in reduced fuel economy and lower turbine power output.

Another method for de-icing involves chemicals. In limited situations, a chemical has been applied to all or part of an aircraft to depress adhesion forces associated with ice accumulation upon the aircraft or to depress the freezing point of water collecting upon surfaces of the aircraft.

The remaining commonly employed method for de-icing is typically termed mechanical de-icing. In the principal commercial mechanical de-icing means, pneumatic de-icing, the leading edge zone or wing or strut component of an aircraft is covered with a plurality of expandable, generally tube-like structures, inflatable employing a pressurized fluid, typically air. Upon inflation, the tubular structures tend to expand substantially the leading edge profile of the wing or strut and crack ice accumulating thereon for dispersal into the airstream passing over the aircraft component. Typically, these tube-like structures have been configured to extend substantially parallel to the leading edge of the aircraft. These conventional low pressure pneumatic de-icers are formed from compounds having rubbery or substantially elastic properties. Typically, the material forming the inflatable tubes on such de-icer structures can expand or stretch by 40% or more during an inflatable cycle, thereby causing a substantial change in the profile of the de-icer as well as the leading edge to thereby crack ice accumulating on the leading edge.

Other mechanical means for effecting de-icing include electromechanical hammering such as that described in U.S. Pat. No. 3,549,964 to Levin et al., although concern respecting the susceptibility of the airfoil skin to stress fatigue upon being hammered over extended periods of time have functioned in part to preclude substantial commercial development or adoption of such techniques.

Another electromechanical ice removal system is described in U.S. Pat. No. 4,690,353 to Haslim et al., wherein one or more overlapped flexible ribbon conductors, each of which is folded back on itself, is embedded in an elastomeric material. When a large current pulse is fed to the conductor, the anti-parallel currents in the opposed segments of adjacent layers of the conductor result in interacting magnetic fields producing an electrorepulsive force between the overlapping conductor segments causing them to be separated near instantaneously. This distention tends to remove any solid body on the surface of the elastomeric material.

Another electromechanical ice removal system is described in U.S. Pat. No. 5,129,598 to Adams et al., the teachings of which are herein incorporated by reference. Two or more sheet-like arrays, each containing in spaced apart relationship a plurality of parallel ribbon-shaped electrical conductive members, are rapidly and forcefully driven apart when a large magnitude current pulse is fed to the conductors.

U.S. Pat. No. 4,706,911 to Briscoe et al. and 4,747,575 to Putt et al. disclose apparatus for de-icing leading edges in which an impulse of fluid under pressure is utilized to rapidly inflate an inflation tube positioned between a support surface and a sheet-like skin possessed of a substantially elevated modulus. The impulse of fluid is delivered to the inflation tube causing the high modulus skin to dislocate and then stop suddenly. Momentum imparted to the ice accumulations thereby causes additional ice movement which assists in ice detachment and dislodgement. The inflatable tubular structure in certain preferred embodiments is inflated within not more than about 0.5 milliseconds. FIG. 4 and the attendant description of U.S. Pat. No. 4,706,911 describe an ejector/pilot operated discharge valve suitable for use in such pneumatic impulse de-icers. In FIG. 7 and the attendant description of U.S. Pat. No. 4,747,575 there is described a chattering valve for use in a pneumatic impulse de-icer which delivers a rapid series of fluid pressure pulses to the inflatable tube of a de-icer apparatus affixed to a leading edge. Efforts to improve such pneumatic impulse de-icing systems have led to continuing efforts to improve valves for delivery of the desired fluid impulse.

Commonly owned U.S. Pat. No. 5,098,037 to Leffel et al. discloses a structural airfoil having an integral expulsive system, wherein the type of expulsive system utilized is variable. The teachings of Leffel et al. are also incorporated herein by reference.

While the devices and methods disclosed in the foregoing patents have been found to be suitable for deicing aircraft, it remains a desired goal of the industry to reduce weight and increase service life and reliability wherever possible. Toward these objectives modern aircraft designers and manufactures are specifying with increasing frequency use of lightweight composite materials manufactured from high modulus fibers including, but not limited to, carbon, graphite, aramid, and glass in matrices of organic resins or carbon. Leading edge surfaces such as those found on wings and struts of aircraft and tail sections have been provided with separately manufactured apparatus such as that disclosed in U.S. Pat. Nos. 4,706,911 and 4,747,575. Such apparatus have been fitted to existing wing structures by adhesive bonding of such auxiliary deicing apparatus. Such auxiliary devices change the contour of the leading edge by virtue of their presence, an undesired consequence. As an alternative, at the time of design or prior to fitting of such an apparatus, the leading edge of the airfoil of certain prior art embodiments has been modified so as to provide a recess for fitting of the deicing apparatus. This latter manner of providing deicing apparatus results in a finished assembly having smooth airflow characteristics due to the provision of such recess. Many of the heretofore known accessory deicing apparatuses were provided with an outer ice accreting surface formed of elastomeric material such as rubber (neoprene) or urethane. These materials are far more susceptible to erosion from the action of rain, sleet, hail, and snow during flight than the conventional aluminum alloy leading edge surface employed on modern large commercial and certain general aviation and commuter aircraft. Such aircraft have a service life expectancy of twenty or more years, including the aluminum alloy skin which is typically from about 0.025 inch to about 0.190 inch thick.

Rain is not the only type of impact that leading edges encounter. Impacts by birds, hail and debris kicked up from the runway and accidents during routine aircraft maintenance are also likely during the operational life of the aircraft.

It is an objective of the aircraft industry to improve the life of de-icing components by decreasing stresses exerted thereon while maintaining dynamic deflection characteristics thereof. Efforts to improve such systems have led to continuing developments to improve their versatility, practicality and efficiency.

SUMMARY OF THE INVENTION

According to an aspect of the present invention, there is provided a de-icing apparatus for an airfoil comprising:
- an airfoil substructure having an apex corresponding to the portion of the airfoil where the radius of curvature of the airfoil is smallest, the airfoil and said apex being bisected by a centerline;
- an outer deflectable shell disposed over said airfoil substructure for meeting and breaking an impinging airstream;
- deflection means disposed between said airfoil substructure and said outer deflectable shell at said apex for deflecting said outer deflectable shell in the area of said apex away from said airfoil substructure; and,
- at least one compressible zone disposed beneath said deflectable shell adjacent said apex on either side of said centerline, said compressible zones facilitating deflection of said deflectable shell overlying said compressible zones toward said airfoil substructure when said deflection means deflects said deflectable shell.

According to another aspect of the invention, there is provided a method of deicing an airfoil having an apex where the radius of curvature of the airfoil is smallest, the airfoil and the apex being bisected by a centerline, the airfoil being comprised of a deflectable shell overlying a substructure, the method comprising the steps of:
- a) providing a deflectable shell over the airfoil;
- b) providing a deflection means between said deflectable shell and the airfoil in the area of the apex; and,
- c) deflecting said deflectable shell with said deflection means away from the airfoil in the area of the apex and toward the airfoil on either side of the centerline behind the apex.

These and other objects, features and advantages of the present invention will become more apparent in the light of the detailed description of exemplary embodiments thereof, as illustrated by the drawings.

BRIEF DESCRIPTION OF THE DRAWINGS

FIG. 1A is a fragmentary sectional view of the de-icer outer shell in FIG. 1.

FIG. 1B is a side view of the connector for securing the skin of the apparatus of FIG. 1 to the airfoil.

BEST MODE FOR CARRYING OUT THE INVENTION

The present invention provides an apparatus in the form of a structural member having integral surface separation capable of deicing a leading edge. The present invention also provides a method of manufacture of such apparatus and a method for deicing employing such apparatus. Deicing is removal of ice subsequent to its formation upon a leading edge. A "leading edge" is that portion of a surface of a structure which functions to meet and break an airstream impinging upon the surface of the structure. Examples of leading edges are respective forward portions of wings, stabilizers, struts, nacelles, and other housings and protrusions first impacted by an airstream passing over an aircraft while in flight.

Figure 1:
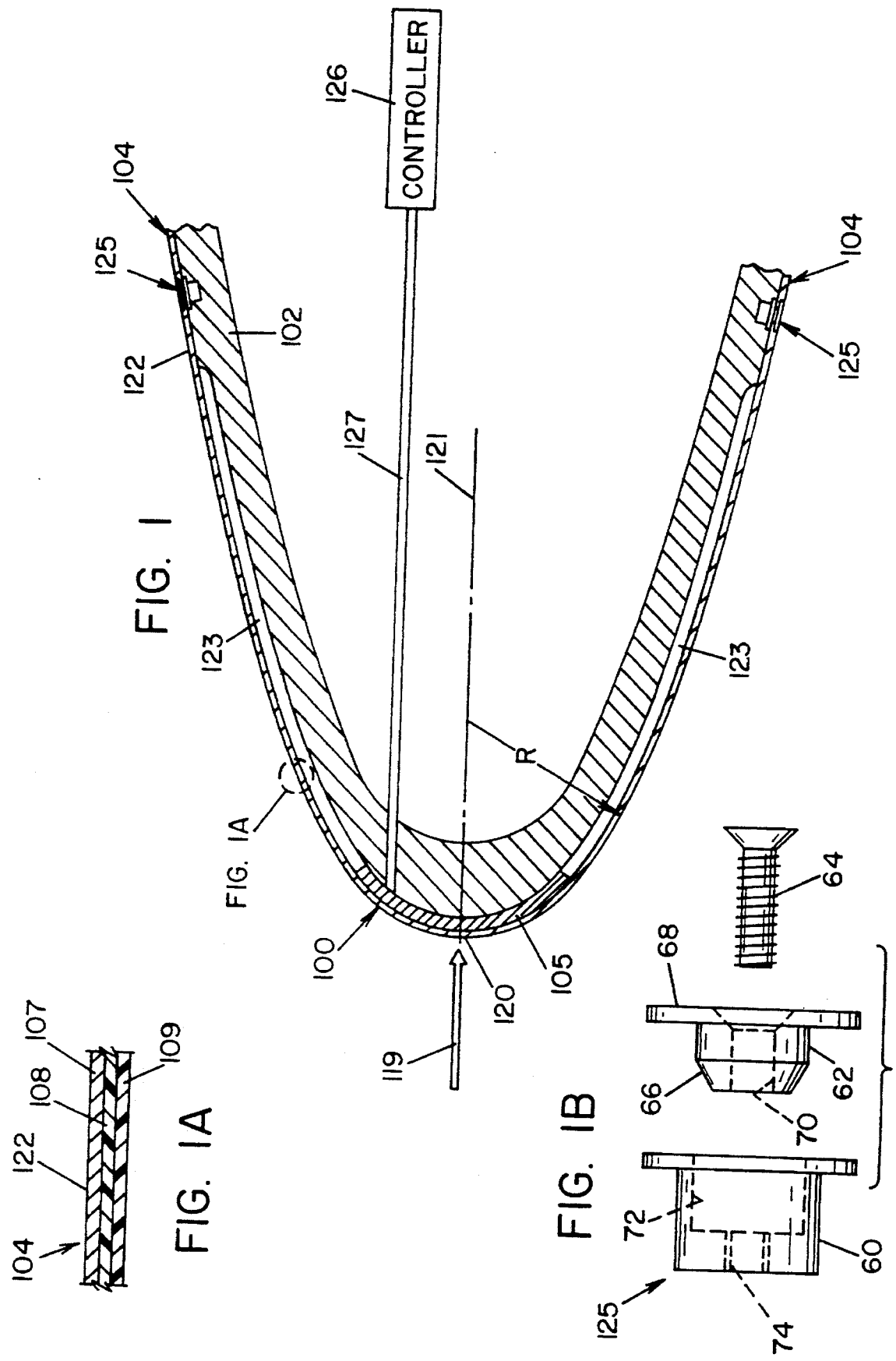
FIG. 1 is a fragmentary sectional view of an airfoil having an apparatus according to the present invention defining the leading edge portion thereof, depicted in the non-energized state.

The invention comprises a new structure for a mechanical impulse de-icer that changes the way in which the outer shell is deflected. Referring now to FIG. 1, a de-icer 100 embodying the invention is shown attached to a substructure 102. Centerline 121 bisects de-icer 100 and substructure 102 at the deicer apex 120. De-icer 100 and substructure 102 have a chordwise and spanwise direction. The chordwise direction is defined as being approximately parallel to the direction of an impinging airstream 119 as it passes around the de-icer 100 and substructure 102. The de-icer 100 and substructure 102 also extend in a spanwise direction which is generally perpendicular to the chordwise direction. The de-icer and substructure can either be straight or have curvature in the spanwise direction. If de-icer 100 is applied to an engine inlet, the spanwise direction corresponds to the circumference of the inlet. In practicing the invention, the spanwise curvature can generally be ignored. Therefore, for the purposes of this application, the term "curvature" refers only to curvature measured in the plane of the chordwise section. The section shown in FIG. 1 is a chordwise cross-section. De-icer 100 comprises a thin deflectable skin or shell 104 disposed over a deflection means 105 and a pair of compressible zones or areas 123 provided in the airfoil 102 adjacent the deflection means 105 on either side of the centerline 121. Compressible zones preferably have a thickness on the order of 0.01 to 0.1 inch. Shell 104 has an outer surface 122 which meets and breaks the impinging airstream. The outer surface 122 has a radius of curvature R, measured perpendicular to the outer surface 122, that changes depending on the chordwise position along the outer surface 122. Shell 104 is impermanently disposed over the substructure 102 and impermanently secured thereto utilizing flush fitting mechanical fasteners 125 which prevent shell 104 from separating from the de-icer substructure 102 and airfoil structure 102 and from stretching in the direction opposite of arrow 119 when the deflection means 105 is energized. It is intended that shell 104 be removable from the substructure 102 to enable field replacement as required, for example, due to impact damage. This would be accomplished by unfastening fasteners 125. Shell 104 may also be permanently or impermanently bonded to either or both the deflection means 105 and substructure 102.

Deflection means 105 may be any of a number of force and displacement devices which cause rapid distortion of shell 104. For instance, deflection means 105 may comprise expandable tubes such as described by the Integral Expulsive System Patent, U.S. Pat. No. 5,098,037. The deflection means 105 can also take forms utilizing electromagnetic apparatus. Examples are presented in the Electro-Impulse Patent, U.S. Pat. No. 5,129,598 and the Planar Coil Patent U.S. Pat. No. 5,152,480 the disclosures of which are fully incorporated herein by reference. A controller 126 which may be either pneumatic or electrical, controls the deflection means via a line 127, which may be either a fluid or electrical line. Unless noted otherwise, the discussion that follows relates with equal force to dynamic de-icers that utilize deflection means comprising electromagnetic apparatus.

Compressible zones 123 are illustrated in FIG. 1 as voids in the substructure 102. As will be described in greater detail hereinafter, these zones allow shell 104 disposed over the compressible zones to deflect toward the substructure 102 when the shell 104 disposed over the deflection means 105 is deflected away from the substructure due to energization of the deflection means. This action is referred to as a "side flex" action, because the sides of the leading edge flex inward upon deflection of the apex of the leading edge outward. Alternatively, compressible zone 123 may be comprised of a compressible member (illustrated hereinafter). It is to be noted that the compressible zones 123 must be stiff enough, however, to resist aerodynamic loads which are experienced during flight so that the compressible zones only flex inward when the deflection means is energized. If there is no compressible member in the zone as illustrated in FIG. 1, then the shell 104 must be adequately stiff to resist unwanted inward flexing.

The shell 104 must have elastic properties. The term "elastic" refers to the tendency of a material to return entirely to its rest state within a short period of time after an imposed force is removed. The ability of deicing assembly 100 to shed ice is dependent upon a multitude of factors, many of which concern the performance characteristics of the shell 104, such as its dynamics (i.e. the dynamic displacements, velocities, and accelerations at various locations on the shell). As the movement rate of the surface increases, minimum ice removal thickness decreases along with the quantity of residual ice left after ice cap removal. In general, a peak shell acceleration of at least 3000 g's (1 g=32.2 f/sec$^2$) at a peak frequency of at least 2000 hertz with a minimum peak deflection of 0.020 inch is desirable. Much greater accelerations, however, may be necessary depending on ice removal requirements.

Referring now to FIG. 1A, the preferred construction of shell 104 to achieve these results includes an outer layer 107, an intermediate layer 108, and a backing layer 109.

Outer layer 107 is preferably an erosion resistant material, such as Titanium foil, polyetheretherketone (PEEK) or polyurethane paint and/or film.

Intermediate layer 108 is preferably a high strength, highly flexible composite for providing good surface dynamics, such as a high strength fabric reinforced with a nitrile phenolic resin or adhesive, hereinafter referred to as a phenolic prepreg. A nitrile phenolic is a phenolic resin blended with nitrile rubber. Preferred fabrics for intermediate layer 108 are woven graphite such as catalog no. CGG300 available from Ciba Geigy, or fiberglass such as Style 120 available from Fiberite. Aramid fabrics may also be utilized for layer 108, but these may have a tendency to damp surface dynamics. A preferred nitrile phenolic for reinforcing the fabric is adhesive catalog no. AF32 available from 3M.

Backing layer 109 is preferably a high strength, stiffer composite (stiffer than intermediate layer 108) for providing stiffness to the shell 104 in selected areas in order to restrict deflections or excursions from the deflection means 105. The preferred material for backing layer 109 is a fabric reinforced with an epoxy adhesive or resin, hereinafter referred to as an epoxy prepreg. Preferred fabrics for backing layer 109 are the same as the fabrics utilized for intermediate layer 108, with woven graphite providing the most favorable results. The preferred material for backing layer 109 is epoxy prepreg catalog no. R6376/CGG108 available from Ciba Geigy or a phenolic prepreg utilizing graphite or glass fibers.

It may be necessary to vary the thickness of backing layer 109 as a function of the radius of curvature of the airfoil. FIG. 1A illustrates a backing layer which increases in thickness as the radius of curvature of the airfoil decreases. In this manner, backing layer 109 selectively stiffens outer shell 104 as a function of position. To this end, it may also be necessary to vary the thickness of backing layer 109 as a function of either or both the chordwise or spanwise position, or to eliminate backing layer 109 altogether in selective areas where increased stiffness is not desirable. Chordwise position is illustrated in FIG. 1 in the plane of the paper and spanwise position in the plane perpendicular to the paper.

The preferred construction of outer shell 104 is defined in greater detail in copending and co-owned patent application number 07/998,360 for an IMPROVED SKIN FOR A DE-ICER, Rauckhorst et al. which is hereby incorporated herein by reference.

It is to be noted that the high strength fabrics utilized for the intermediate layer 108 or the backing layer 109 may be either square woven or unidirectional. If square woven fabric is utilized, the fabric should be oriented so that the weave angled with respect to either the chord line or the span line of the airfoil, with the preferred angle of orientation being 45'.

Referring now to FIG. 1, the shell 104, deflection means 105, and substructure 102 can be permanently bonded together to form a unitary structure with integral ice removal capability as described in the Integral Expulsive System Patent. Alternatively, the shell 104 and deflection means 105 can be combined into a unitary structure which is then impermanently attached to an existing aircraft substructure 102.

The substructure 102 provides the structural integrity necessary to absorb and resist flight loads and unexpected impacts with foreign objects. The substructure can be formed from a metal, such as aluminum, or fiber reinforced plastic materials that are commonly used on aircraft such as epoxy impregnated glass or graphite fabrics.

Referring now to FIG. 1B, the preferred attachment means 125 for attaching the outer shell 104 and/or underlying substructure to the airfoil structure 102 is a shear resistant fastener assembly that includes a receptacle or seat 60 which receives a pin 62 and fastener 64. Pin 62 has a chamfered cylinder 66, head portion 68 and a clearance hole 70. Seat 60 has a receptacle opening 72 for receiving chamfered cylinder 66 and a threaded hole 74 for receiving and engaging with fastener 64. It is intended that seat 60 be imbedded or disposed within airfoil 102 and pin 62 be imbedded or disposed within either the outer shell 125. Fastener 64 is then slid through pin 62 and screwed into seat 60. Each de-icing unit of the present invention would utilize a multiplicity of such attachment means. This type of attachment means is effective in withstanding the large shear force generated at the fastener when the deflection means 105 is energized.

Figure 2:
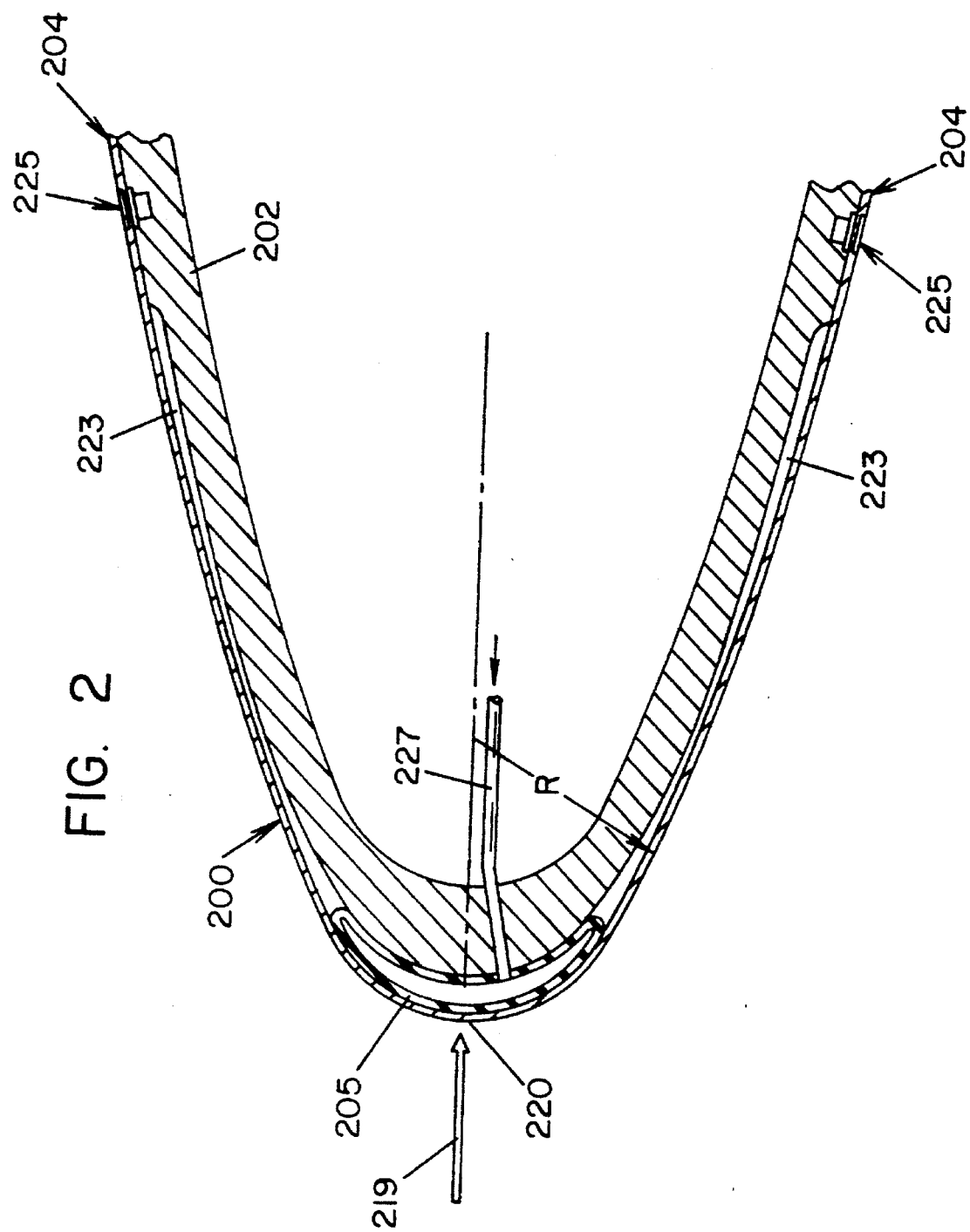
FIG. 2 is a fragmentary sectional view of an airfoil having an apparatus according to the present invention defining the leading edge portion thereof, and having an inflatable tube deflection means depicted in an energized state.

Referring now to FIG. 2, wherein a de-icer in accordance with an alternate embodiment of the present invention is generally similar to the de-icer illustrated hereinbefore in the previous figures and is thus indicated by references numerals corresponding to those discussed above, except that a 200 "prefix" is utilized. In the embodiment presented, the deflection means 205 consists of an expandable tube. The expandable tube can be formed from fiber reinforced plastic material such as nitrile phenolic coated nylon fabric, or rubber coated fabric such as neoprene coated nylon fabric. The deflection means 205 is activated by releasing compressed air into the line 207, as described in the Pneumatic Impulse Patent or Integral Expulsive System Patent. Inflation of the tube is preferably achieved in less than 0.1 second and most preferably in less than 500 microseconds.

Deflection means 205 is shown in an activated state by inflation of the tube. Rapid inflation of the tube deflects the shell 204 outward at the apex 220, developing tension in shell 204. The tension in shell 204 is transferred from the area over the deflection means 205 to the area over the compressible zones 223, thereby compressing the compressible zones 223 and allowing the shell 204 over the compressible member 223 to move inward, as illustrated. This movement must occur rapidly enough to debond, shatter and eject ice pieces into the impinging airstream 219 where they are swept away. The compressed air is subsequently vented from the tube, and the shell 204 snaps back to its rest position due to the elastic properties of the shell 204.

Figure 3:
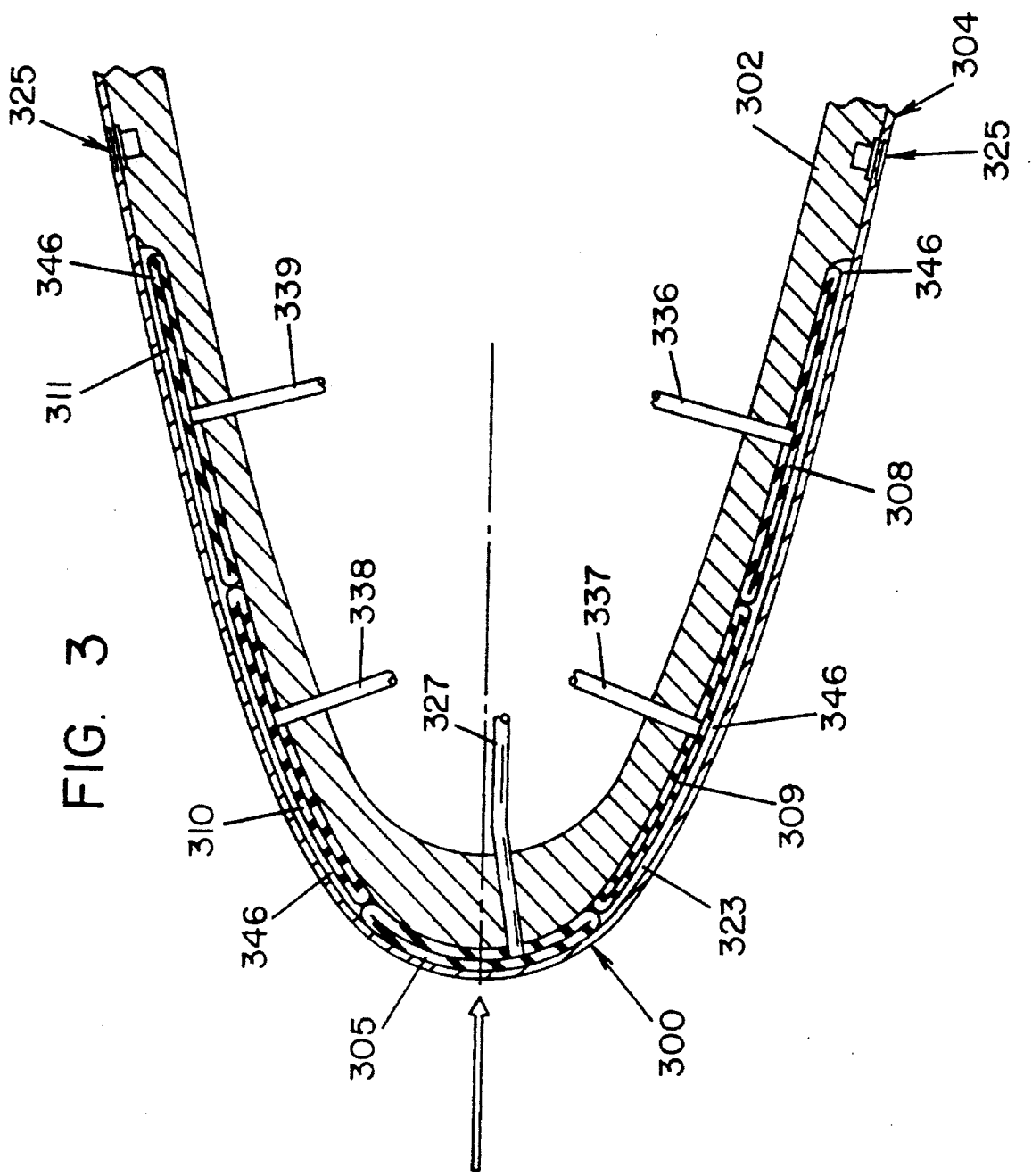
FIG. 3 is a fragmentary sectional view of an airfoil having an apparatus according to an alternate embodiment of the present invention defining the leading edge portion thereof, and having a plurality of inflatable tube deflection means depicted in an non-energized state.

Referring now to FIG. 3, wherein a de-icer in accordance with an alternate embodiment of the present invention is generally similar to the de-icer illustrated hereinbefore in the previous figures and is thus indicated by references numerals corresponding to those discussed above, except that a 300 "prefix" is utilized. In FIG. 3, different tube and compressible member arrangements are presented and may be desirable depending on the application. A tube 305 (supplied fluid by a line 327) is provided between substructure 302 and shell 304 at the apex of the leading edge. A plurality of tubes 308–311 are provided in the compressible zones 323 adjacent the tube 305. Tubes 308–311 are provided fluid through lines 336–339 and can be utilized to add additional de-icing capability as needed. It is to be noted that teflon tape 346 may be provided around the edges of the tubes 308–311 to prevent adhesion thereof in order to facilitate a wider expansion profile of the tubes. Tubes 308–311 extend in the spanwise direction beneath the shell 304. Enough space exists between tubes 308–311 and shell 304 to allow shell 304 to flex inward when tube 305 is expanded. Shell 325 is shown secured by fasteners 325.

Figure 4:
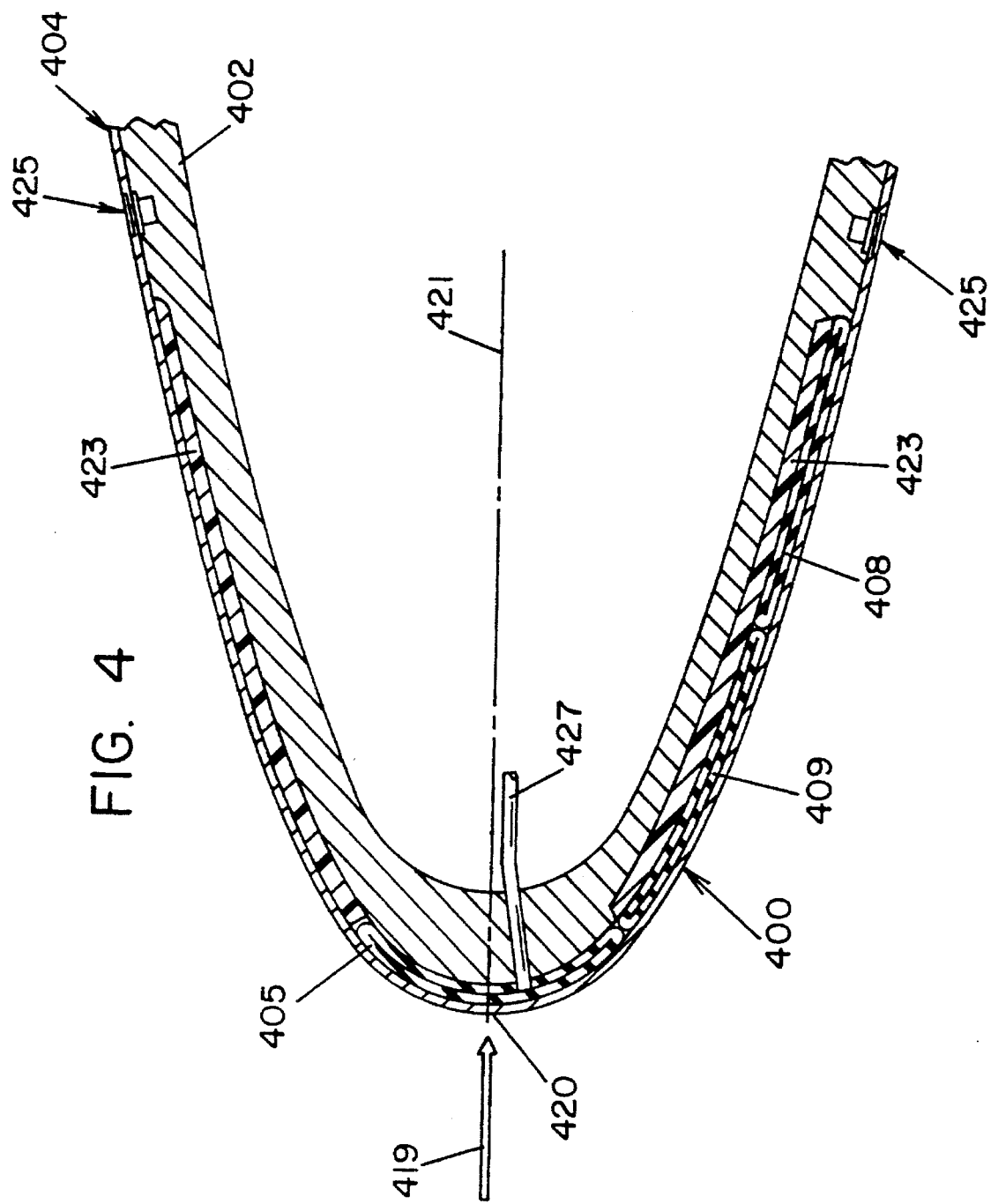
FIG. 4 is a fragmentary sectional view of an airfoil having an apparatus according to an alternate embodiment of the present invention defining the leading edge portion thereof, and having an inflatable tube deflection means depicted in a non-energized state.

Referring now to FIG. 4, wherein a de-icer in accordance with an alternate embodiment of the present invention is generally similar to the de-icer illustrated hereinbefore in the previous figures and is thus indicated by references numerals corresponding to those discussed above, except that a 400 "prefix" is utilized. A de-icer 400 embodying the invention is shown attached to a substructure 402. Centerline 421 bisects de-icer 400 and substructure 402 at the deicer apex 420. A thin deflectable shell 404 disposed over a deflection means 405 and a pair of compressible members 423 disposed between shell 404 and the airfoil 402 adjacent the deflection means 405 on either side of the centerline 421. Shell 404 is impermanently disposed over the substructure 402 and impermanently secured thereto utilizing flush fitting mechanical fasteners 425 which prevent shell 404 from separating from the de-icer substructure 402 and deflection means 405 and from moving in a direction opposite to arrow 419 when the deflection means 405 is energized. Additional deflection means 408,409 are provided between compressible member 423 and shell 404 beneath centerline 421. This type of arrangement may also be utilized on either side, both sides, or neither side of centerline 421.

The shell 404 and compressible members 423 must have elastic properties. Examples of suitable materials for the compressible members 423 include natural rubber, and synthetic rubbers such as butyl or silicone rubber. The upper limit for the durometer of the compressible member should be about a Shore D 70, but preferably less than Shore A 90. A strip of chlorobutyl rubber having a Shore A durometer within the range from about 55 to 65 is particularly useful, especially when combined with an outer shell 404 comprised of carbon or glass fiber reinforced nitrile phenolic.

Figure 5:
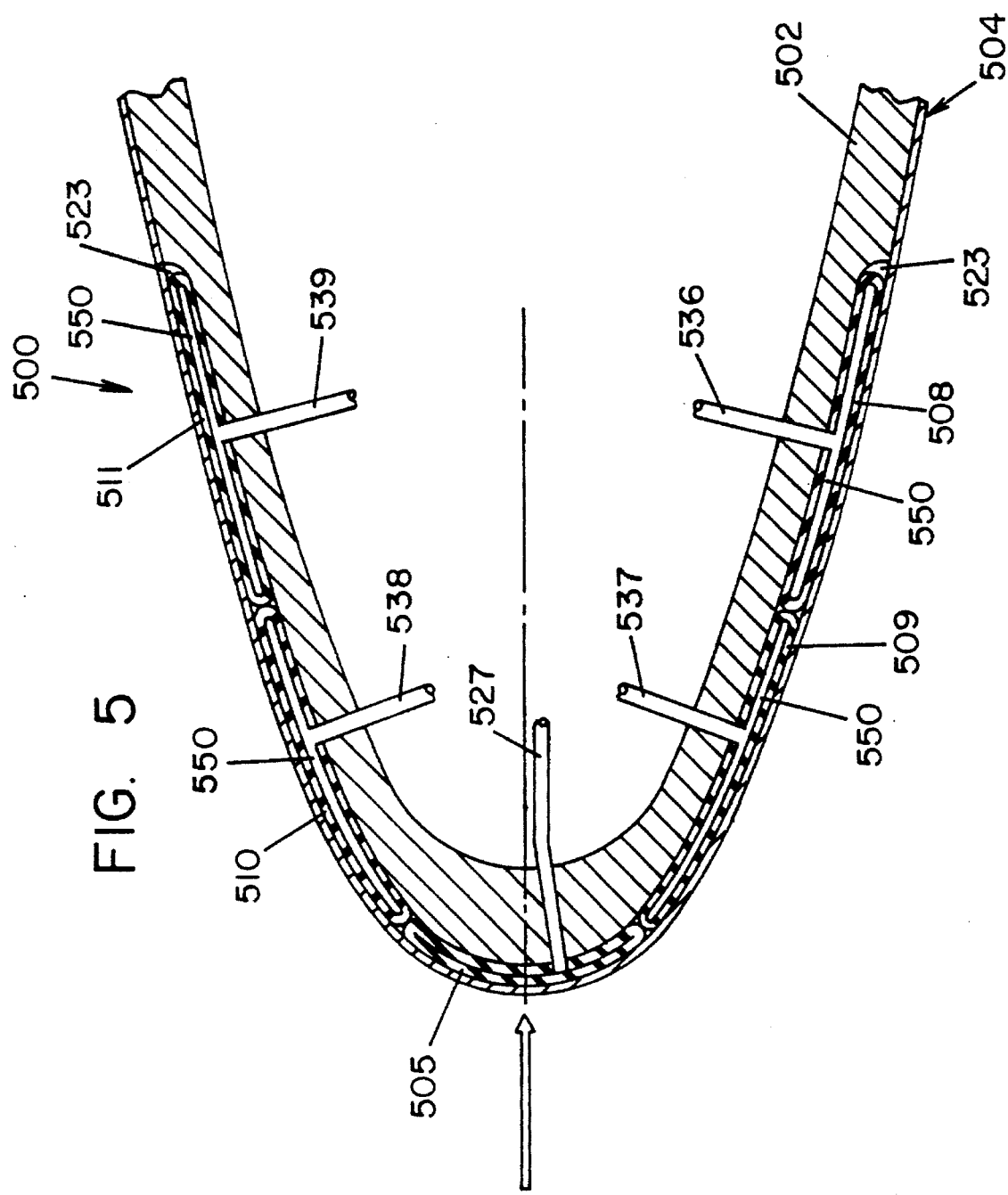
FIG. 5 is a fragmentary sectional view of an airfoil having an apparatus according to an alternate embodiment of the present invention defining the leading edge portion thereof, and having permanently partially expanded inflatable tube deflection means depicted in a non-energized state.

Referring now to FIG. 5, wherein a de-icer in accordance with an alternate embodiment of the present invention is generally similar to the de-icer illustrated hereinbefore in the previous figures and is thus indicated by references numerals corresponding to those discussed above, except that a 500 "prefix" is utilized. In FIG. 5, different tube and compressible member arrangements are presented and may be desirable depending on the application. A tube 505 (supplied fluid by a line 527) is provided between substructure 502 and shell 504 at the apex of the leading edge. A plurality of tubes 508–511 are provided in the compressible zones 523 adjacent the tube 505. Tubes 508–511 are provided fluid through lines 536–539 and can be utilized to add additional de-icing capability as needed. Tubes 508–511 extend in the spanwise direction beneath the shell 504, and are preformed to have permanent openings 550 provided therein. Openings 550 allow shell 504 to deflect inward and reduce or eliminate clearance between the top of tubes 506–513 and the shell 504.

It is to be noted that the best deflection means and compressible member arrangement depends on a variety of factors that can vary greatly depending on an airframe manufacturer's specifications. Such factors include, the leading edge geometry, flight characteristics, maximum thickness of ice that can be tolerated, cost, life, reliability and weight. The geometry of the system may be designed so that the compressible zones have a depth or stiffness which allows the outer shell to "bottom out" at the compressible zones and touch the airfoil or underlying substructure. Ice removal characteristics of the system may be positivley affected under such conditions.

Though discussed in terms of individual separation assemblies, comparing FIGS. 1–5 suggests that several separation assemblies could be formed into a single unitary blanket. For example, the four separation assemblies underlying the four segments of de-icer 300 as shown in FIG. 3 could be combined into a single blanket.

Other variations not specifically presented are also considered to be within the purview of this invention. For example, the deflection means has consistently been shown centered on the apex. It could be shifted away from the apex in the chordwise direction as long as is deemed necessary, depending on the geometry. Finally, in all of the embodiments disclosed thus far, the compressible zones have been symmetric with respect to the centerline. Depending on the application, these could be shifted so that compressible zone overlying one portion of the substructure is greater than that overlying the opposing portion. Also, the geometry of the substructure and de-icer has been depicted as symmetric about the centerline. In most applications, however, the active area and leading edge geometry will not be symmetric about the centerline. To this end, a single compressible zone disposed on one side of the apex rather than both sides is possible also.

A copending and co-owned compressible nose patent application relating to similar subject matter as the present invention is application number 07/998,283 for a COMPRESSIBLE NOSE DYNAMIC DE-ICER, Rauckhorst, which is hereby incorporated herein by reference.

We claim:

1. An airfoil deicing system comprising:

an airfoil substructure having an apex corresponding to the portion of the airfoil where the radius of curvature of the airfoil is smallest, the airfoil and said apex being bisected by a centerline;

a deflectable shell disposed over said airfoil substructure for meeting and breaking an impinging airstream;

deflection means disposed between said airfoil substructure and said deflectable shell at said apex for deflecting said deflectable shell in the area of said apex away from said airfoil substructure; and, at least one compressible zone provided beneath said deflectable shell adjacent said apex on either side of said centerline, said compressible zones facilitating deflection of said deflectable shell overlying said compressible zones toward said airfoil substructure when said deflection means deflects said deflectable shell.

2. An airfoil deicing system in accordance with claim 1, wherein said deflectable shell is comprised of a fabric reinforced plastic composite.

3. An airfoil deicing system in accordance with claim 2, wherein said fabric is comprised of square woven fabric.

4. An airfoil deicing system in accordance with claim 2, wherein said fabric is comprised of unidirectional fabric.

5. An airfoil deicing system in accordance with claim 2, wherein said fabric is comprised of graphite.

6. An airfoil deicing system in accordance with claim 2, wherein said fabric is comprised of fiberglass.

7. An airfoil deicing system in accordance with claim 2, wherein said fabric is comprised of aramid fabric.

8. An airfoil deicing system in accordance with claim 1, wherein said deflection means is comprised of:

at least one inflatable member; and, means for inflating said at least one inflatable member.

9. An airfoil deicing system in accordance with claim 1, wherein said deflection means is comprised of an electromagnetic means.

10. An airfoil deicing system in accordance with claim 1, wherein said deflectable shell comprises from top to bottom:

an outer layer;

an intermediate layer comprised of a first composite; and, a backing layer comprised of a second composite.

11. An airfoil deicing system in accordance with claim 10, wherein said first composite is comprised of square woven fabric.

12. An airfoil deicing system in accordance with claim 10, wherein said first composite is comprised of unidirectional fabric.

13. An airfoil deicing system in accordance with claim 10, wherein said first composite is comprised of graphite.

14. An airfoil deicing system in accordance with claim 10, wherein said first composite is comprised of fiberglass.

15. An airfoil deicing system in accordance with claim 10, wherein said first composite is comprised of aramid fabric.

16. An airfoil deicing system in accordance with claim 10, wherein the airfoil has a varying curvature, and said backing layer has a thickness which varies as a function of the varying curvature.

17. An airfoil deicing system in accordance with claim 10, wherein the airfoil has a spanwise length, and said backing layer has a thickness which varies as a function of the spanwise length.

18. A deicer in accordance with claim 10, wherein said first composite is comprised of fabric reinforced by nitrile phenolic resin.

19. A deicer in accordance with claim 10, wherein said second composite is comprised of fabric reinforced by epoxy resin.

20. An airfoil deicing system in accordance with claim 1 wherein said compressible zones are comprised of compressible members.

21. An airfoil deicing system in accordance with claim 20, wherein said deflection means divides said compressible members, said deflection means and compressible members being immediately subjacent said shell, and said shell deflection means abuts said compressible members.

22. An airfoil deicing system in accordance with claim 1, further comprising additional deflection means provided in said compressible zones.

23. An airfoil deicing system in accordance with claim 20, wherein said compressible members are comprised of an elastomer.

24. An airfoil deicing system in accordance with claim 20, wherein said compressible members are comprised of butyl rubber.

25. An airfoil deicing system in accordance with claim 1, wherein said deflectable shell includes at least one layer of fiber reinforced plastic that selectively stiffens said shell.

26. An airfoil deicing system in accordance with claim 1, wherein said thin deflectable shell includes at least one layer of fabric impregnated with nitrile phenolic matrix, the fibers of said fabric layer belonging to one of a group including carbon fibers, glass fibers, nylon fibers, and aramid fibers.

27. An airfoil deicing system in accordance with claim 1, wherein said deflectable shell is impermanently disposed over the airfoil substructure.

28. An airfoil deicing system in accordance with claim 1, further comprising separable attachment means for impermanently attaching said deflectable shell to the airfoil substructure.

29. An airfoil deicing system in accordance with claim 28, wherein said separable attachment means comprises a fastener.

30. An airfoil deicing system in accordance with claim 1, further comprising controller means for controlling said deflection means.

31. A method of deicing an airfoil having an apex where the radius of curvature of the airfoil is smallest, the airfoil and the apex being bisected by a centerline, the method comprising the steps of:

a) providing a deflectable shell over the airfoil;

b) providing a deflection means between said deflectable shell and the airfoil in the area of the apex; and, c) deflecting said deflectable shell with said deflection means away from the airfoil in the area of the apex and toward the airfoil on either side of the centerline behind the apex.

32. A method of deicing an airfoil in accordance with claim 30, wherein the thickness of said deflectable shell varies as a function of the position of said deflectable shell on the airfoil.

33. A method of deicing an airfoil in accordance with claim 30, further comprising the step of impermanently attaching said deflectable shell to the substructure.

34. A method of deicing an airfoil in accordance with claim 30, wherein said deflectable shell is comprised of a composite.

35. A method of deicing an airfoil in accordance with claim 30, wherein said deflection means is comprised of an inflatable member.

36. A method of deicing an airfoil in accordance with claim 30, wherein said deflection means is comprised of an electromagnetic means.

37. A method of deicing an airfoil in accordance with claim 30, further comprising the step of providing compressible members between said deflectable shell and the airfoil adjacent either side of the apex.

38. A method of deicing an airfoil in accordance with claim 37, wherein said deflection means divides said compressible members, said deflection means and compressible members being immediately subjacent said shell, and said shell deflection means abuts said compressible members.

39. A method of deicing an airfoil in accordance with claim 37, further comprising additional deflection means provided in said compressible zones.

40. A method of deicing an airfoil in accordance with claim 37, wherein said compressible members are comprised of an elastomer.

41. A method of deicing an airfoil in accordance with claim 37, wherein said compressible members are comprised of butyl rubber.

42. A deicing system for an airfoil having an apex corresponding to the portion of the airfoil where the radius of curvature of the airfoil is smallest, the airfoil and the apex being bisected by a centerline, the deicing system comprising:

a deflectable shell disposed over the airfoil for meeting and breaking an impinging airstream;

deflection means disposed between beneath said deflectable shell at said apex for deflecting said deflectable shell in the area of said apex away from the airfoil and into the airstream; and, at least one compressible member provided beneath said deflectable shell adjacent said apex on either side of said centerline, said compressible zones facilitating deflection of said deflectable shell overlying said compressible member toward the airfoil when said deflection means deflects said deflectable shell.

* * * * *